(12) United States Patent
Shaffer et al.

(10) Patent No.: US 6,185,286 B1
(45) Date of Patent: Feb. 6, 2001

(54) APPARATUS AND METHOD FOR IMPROVED DIAL-TYPE RECOGNITION

(75) Inventors: Shmuel Shaffer, Palo Alto; William Joseph Beyda, Cupertino, both of CA (US)

(73) Assignee: Siemens Information and Communication Networks, Inc., Boca Raton, FL (US)

(*) Notice: Under 35 U.S.C. 154(b), the term of this patent shall be extended for 0 days.

(21) Appl. No.: 09/041,079

(22) Filed: Mar. 11, 1998

(51) Int. Cl.[7] .............................. H04M 3/50; H04M 3/54
(52) U.S. Cl. ................................. 379/210; 379/359
(58) Field of Search .......................... 379/88.01, 88.04, 379/88.18, 88.19, 88.2, 350, 359, 373, 165, 210, 211, 212, 214

(56) References Cited

U.S. PATENT DOCUMENTS 4,827,500 * 5/1989 Binkerd et al. .................. 379/88.01
5,388,150 * 2/1995 Schneyer et al. ................ 379/88.19

* cited by examiner

Primary Examiner—David R. Hudspeth
Assistant Examiner—Martin Lerner

(57) ABSTRACT

A system whereby automatic dial-type recognition is employed to reduce the wait time for callers and prevent false identification of touch tone versus dial tone service. A system according to the present invention includes a control unit (103) located in a PBX (104) or other switch which detects whether a caller is placing a call using pulse or DTMF dialing. The control unit (103) in the PBX (104) generates a message during call setup which it provides to the remote system, such as an interactive voice response system.

17 Claims, 5 Drawing Sheets

APPARATUS AND METHOD FOR IMPROVED DIAL-TYPE RECOGNITION

BACKGROUND OF THE INVENTION

1. Field of the Invention

The present invention relates to telecommunication systems, and in particular, to a communications system employing DTMF and pulse dialing.

2. Description of the Related Art

In modern interactive voice response (IVR) and voice mail systems, the preferred mechanism for user interaction from remote and sometimes local systems is via dual-tone multi-frequency (DTMF) recognition. However, in many parts of the world and even in North America, there remains a significant rotary or pulse dial base.

In order to accommodate both the installed DTMF and rotary dial bases, IVR systems provide an option for callers to either stay on the line ("if you have a rotary phone") or to "press 1 now" ("if you have a Touch Tone phone"). Thus, current systems require the user to identify themselves, thereby tying up system resources while the system waits for the time-out that sends the rotary caller to a human operator. Touch tone callers must therefore go through a time-wasting step of listening to a message and pressing a digit just to identify themselves as touch tone callers. Rotary callers must often wait through an entire touch tone menu just to get service. Moreover, customer service companies often put elaborate menus in place to ensure that callers have tried an automated service before going to the more costly human service. Often, callers skip these menus by pretending to have rotary phones. While this is an advantage to the caller, the companies find that they have invested in a system but are receiving no benefits.

Accordingly, there is a need for a system for automatically identifying whether a caller has rotary or DTMF capabilities. There is a still further need for a system whereby line utilization is improved by removing a time-out condition from rotary callers.

SUMMARY OF THE INVENTION

These and other drawbacks in the prior art are overcome in large part by a system and method according to the present invention. More particularly, the present invention provides a system whereby automatic type recognition is employed to reduce the wait time for callers and prevent false identification of touch tone versus dial tone service. A system according to the present invention includes a control unit located in a PBX or other switch which detects whether a caller is placing a call using pulse or DTMF dialing. The control in the PBX generates a message during call setup which it provides to a remote system, such as an interactive voice response system.

More particularly, a control unit according to the present invention monitors whether a call request is received at a central switch using DTMF dialing or pulse dialing. Based on this determination, the control unit causes, for example, an ISDN controller to pack its setup word with the corresponding information.

BRIEF DESCRIPTION OF THE DRAWINGS

A better understanding of the present invention is obtained when the following detailed description is considered in conjunction with the following drawings in which.

DETAILED DESCRIPTION OF THE INVENTION

Figure 1:
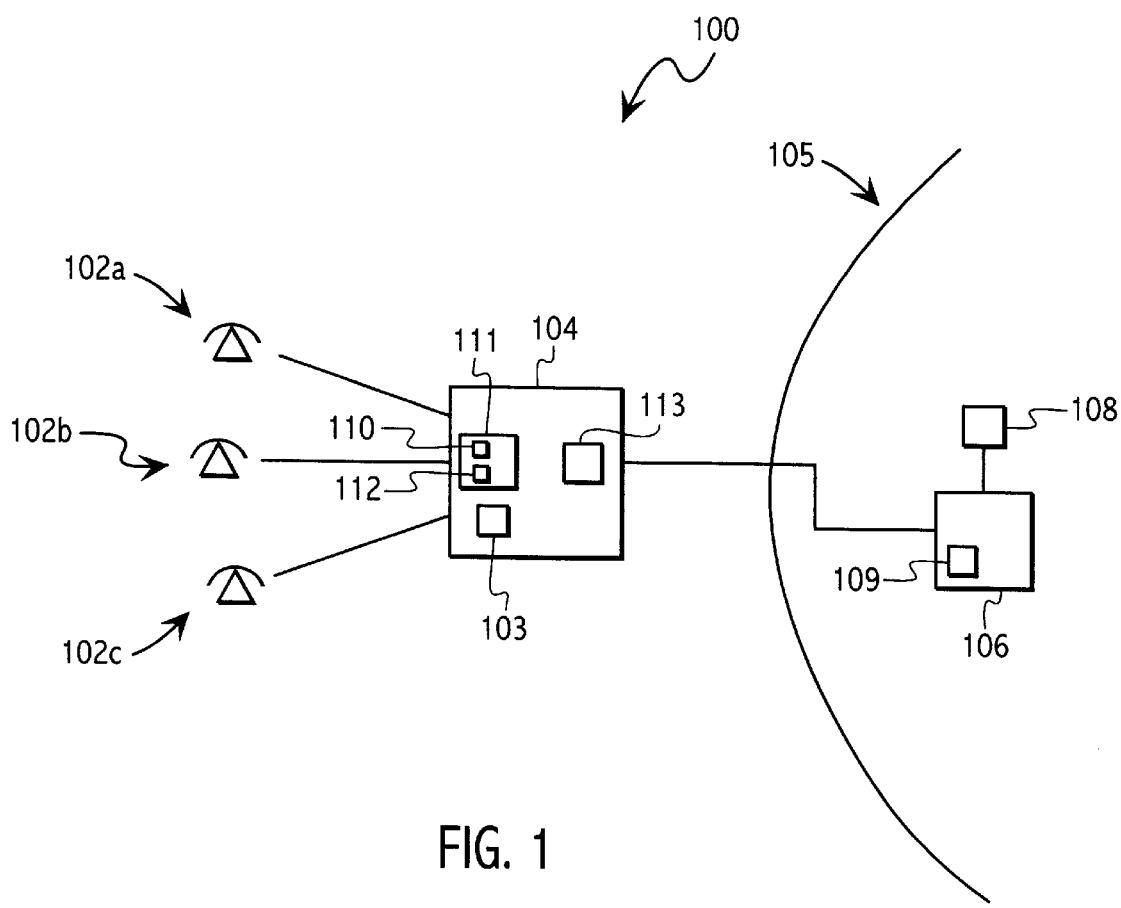
FIG. 1 is a block diagram illustrating a telephony system according to an embodiment of the present invention.

Turning now to the drawings, and with particular attention to FIG. 1, a block diagram illustrating a telecommunication system 100 according to an embodiment of the present invention is shown. The telecommunication system 100 includes a central switch 104, such as a private branch exchange (PBX) or a central office (CO). A plurality of telephones 102a–102c are coupled to the central switch 104. The telephones 102a–102c may be either DTMF or pulse dialing telephones. It is noted that, while only three telephones 102a–102c are shown, in practice, a larger number may be provided. In addition, telephony devices, such as faxes, may also be coupled to the central switch 104. Thus, FIG. 1 is exemplary only. The central switch 104 is configured to receive the DTMF or pulse signals and set up the corresponding telephone call with devices coupled in or to the public switched telephone network (PSTN) (or ISDN network) 105. The central switch 104 includes a dialing interface 111 for receiving dial signals from the telephones 102a–102c. The central switch 104 thus includes a standard DTMF receiver 110 and pulse receiver 112. As will be discussed in greater detail below, a control unit 103 is configured to monitor the DTMF receiver 110 and the pulse receiver 112 and determine whether a request for call set up is being made.

For example, the control unit 103 may monitor output lines for activity. As will also be explained in greater detail below, the control unit 103 is further configured to send a command during the call set up identifying whether the caller is using a rotary or Touch Tone telephone, to the receiving device, which may be a private branch exchange (PBX) 106 including an interactive voice response (IVR) unit 108. The PBX 106 includes a receiver 109, which is configured to receive the signal from the control unit 103 of the central switch 104. In response thereto, the IVR 108 either switches the caller to a human operator or to the automatic voice response system. The receiver 109 may be a known receiver configured to receive and decode ISDN signals. Additionally, the system may be coupled to an ISDN controller 113 for converting the resulting pulse code modulated signals into ISDN format for transmission to other devices such as the PBX 106.

Figure 2:
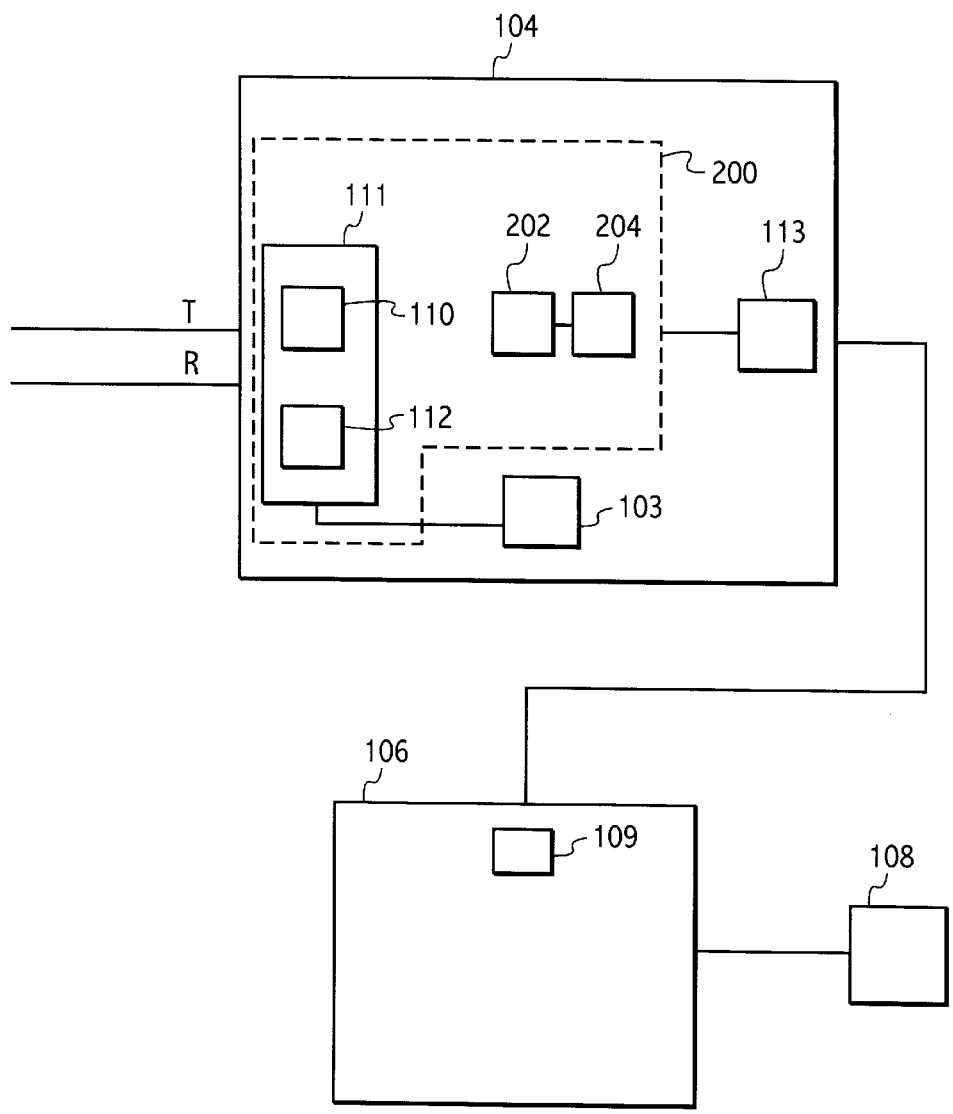
FIG. 2 is a block diagram illustrating in greater detail the telephony system of FIG. 1.

Turning now to FIG. 2, a diagram illustrating a central switch, illustrated as a PBX 104 according to an embodiment of the present invention is shown in greater detail. In particular, as discussed above, the central switch 104 includes a dialing interface 111, which includes a DTMF dial receiver 110 and pulse receiver 112.

As illustrated, the dialing interface 111 is embodied in a subscriber line interface circuit, or card (SLIC) 200. The SLIC 200 performs the known BORSCHT functions of Battery feed, Over-voltage protection, Ringing, Supervision, Coding/Decoding, Hybrid and signal conditioning, and Test.

Accordingly, the SLIC 200 includes a hybrid 202 and a codec 204. The codec 204 may be a combined filter codec, or combocodec as are well known. The codec 204 is configured to perform known coding and decoding, including compression and decompression (such as $\mu$ law or a-law), of the audio signals. Other components of SLIC 200 are well known and not illustrated.

A control unit 103 is coupled to the SLIC 200. The control unit 103 may be embodied as a microprocessor or microcontroller, or application specific integrated circuit. Finally, the control unit 103 may be configured to provide overall control of the central switch 104, as well as DTMF/pulse identification according to the present invention, as will be discussed in greater detail below.

In particular, as will be described in greater detail below, the ISDN controller 113 is configured to receive a signal from the control unit 103 indicative of whether the incoming call received on the tip T and ring R lines is via a Touch Tone or pulse telephone. The ISDN controller 113 then packs its set up signal to the PBX 106 with data corresponding to the type of telephone making the call.

As is well known, the central switch 104 is able to respond to calls made using DTMF or pulse dialing. The control unit 103 is coupled to the DTMF and pulse dialing receivers 110, 112 and is configured to determine whether the incoming call has, in fact, been received using DTMF or pulse dialing. For example, the control unit 103 may monitor output lines. The control unit 103 then provides a signal to the receiving unit during call set up.

Figure 3:
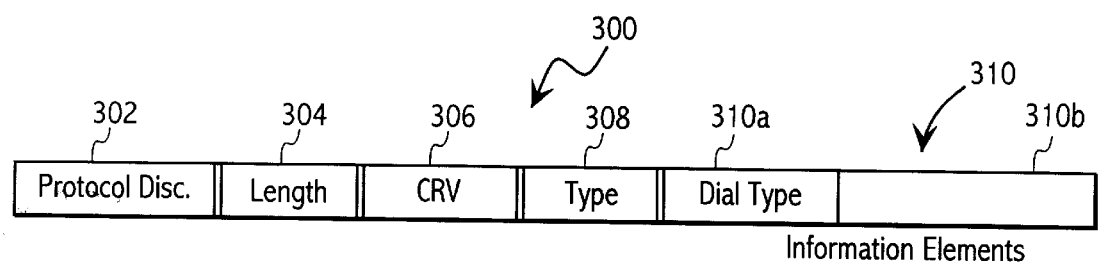
FIG. 3 is a diagram illustrating an ISDN setup information field according to an embodiment of the present invention.

In particular, turning now to FIG. 3, a diagram illustrating an ISDN information field 300 according to the present invention is shown. As is well known, the ISDN information field 300 is a variable length field that contains the Q.931 protocol data used for the establishment maintenance and termination of network connections between two devices. The information field 300 includes a protocol discriminator field 302 which identifies the layer three protocol such as Q.931. In addition, a length field 304 is provided to indicate the length of the next field, the call reference value (CRV) field 306. The call reference value field 306 is used to uniquely identify each call on user network interface. A message type field 308 is provided to identify the message type such as set up, connect, acknowledge, etc. The message type determines what additional information is required and/or allowed. Finally, a variable length information element field 310 is provided. The information element depends on the message type. According to the present invention, when the message type 308 is set to "set up", a dial-type subfield 310a is provided in the information element field 310. The dial-type field 310a identifies whether the call has been made using pulse or DTMF dialing. As will be discussed in greater detail below, during call set up the dial-type field 310a is read by the receiving PBX 106 and forwarded to the IVR 108. In particular, as is well known, the receiver 109 may be a known ISDN receiver, which decodes the ISDN setup information, including the dial-type subfield. If the dial-type indicates that DTMF signalling has been employed, then the receiver 109 and the IVR 108 switch the call to the automatic IVR system. However, if the dial-type field 310a indicates that pulse dialing has been used, then the receiver 109 and the IVR 108 operate to switch the received call to a human operator.

Figure 4:
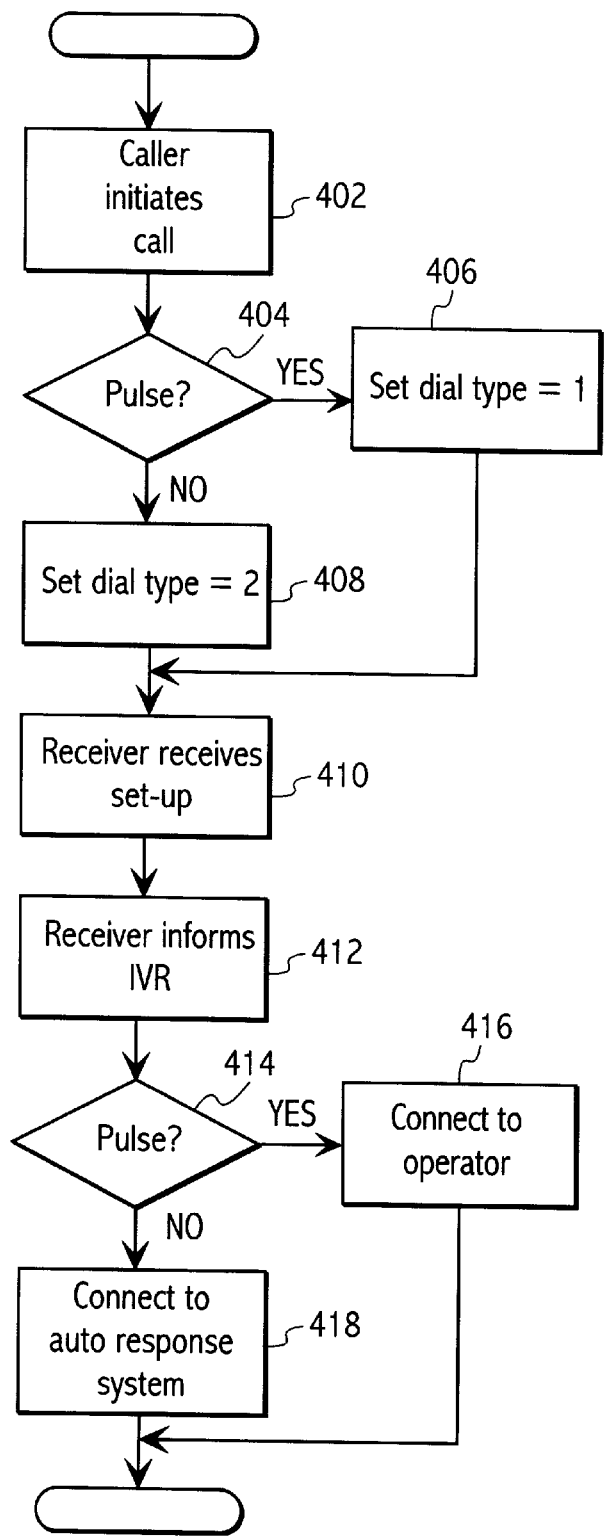
FIG. 4 is a flowchart illustrating operation of an embodiment of the present invention.

Turning now to FIG. 4, a flowchart 400 illustrating operation of an embodiment of the present invention is shown. The flowchart 400 illustrates overall operation of the system at both the caller and terminator. In particular, in a step 402, a caller using one of the telephones 102a–102c initiates a call. In response thereto, the central switch 104 detects the off-hook condition and receives the input telephone digits. The input digits are received by the dial interface 111. Depending on whether the input digits have been made using DTMF signalling or pulse dialing, the DTMF detector 110 or the pulse detector 112 process the signals. In a step 404, the control unit 103, which has been monitoring the dial interface 111, determines whether the call has been made using DTMF or pulse dialing. If the call has been made using pulse dialing, then in a step 406 the control unit 103 will instruct the ISDN interface 113 to make the appropriate indication in the dial-type field 310a of the information elements field 310 of the information field 300. However, if the dial-type was detected as being DTMF, then the control unit 103 will instruct the ISDN interface 113 to make the corresponding alternate setting in the dial-type field 310a in a step 408. In a step 410, the ISDN interface 113 sends the call set up information field 300 to the receiving PBX 106. As discussed above, the receiving PBX 106 includes an ISDN controller 109 which is configured to decode the received information field 300. The PBX 106 then sets up the call with the IVR 108 and forwards to the IVR 108 whether the dial-type field 310a indicates DTMF or pulse dialing at the other end in a step 412. In a step 414, the IVR 108 processes the information of whether DTMF or pulse dialing has been used. In a step 416, the IVR 108 connects the call to a human operator if pulse dialing has been employed and in a step 418 connects the caller to the IVR system if DTMF dialing has been used.

Figure 5:
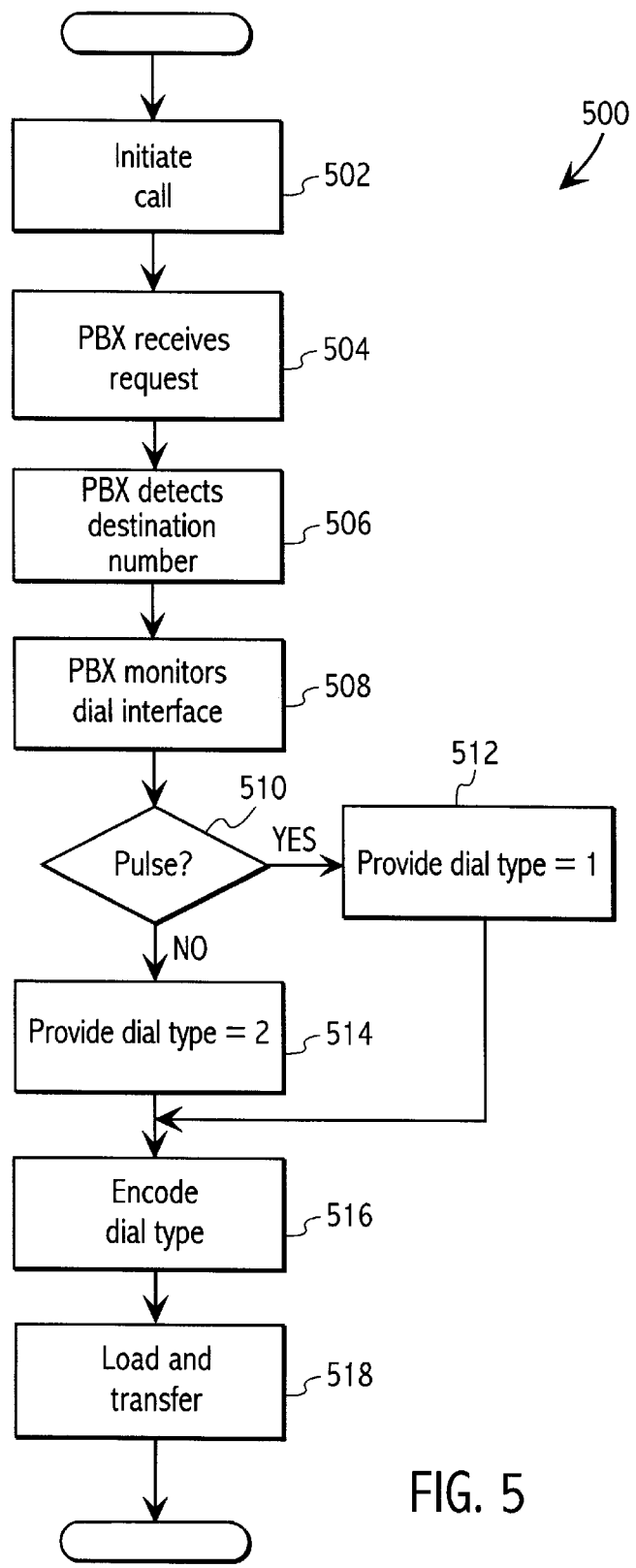
FIG. 5 is a flowchart illustrating operation of an aspect of the invention.

Turning now to FIG. 5, a flowchart illustrating operation of the transmitting central switch's 104 operation is shown according to an aspect of the present invention. In particular, in a step 502 a caller initiates a call which is received at the central switch 104. The PBX receives the call request in a step 504 in a standard fashion, for example, via loop start detection. In a step 506, the dialing interface 111 detects the dialing number. In a step 508, the control unit 103 monitors the dialing interface 111 to determine whether the call has been received via the DTMF detector 110 or the pulse detector 112. In a step 510, the controller 103 makes the decision. If the DTMF detector 110 has been used, then in a step 514 the control unit 103 will cause the ISDN controller 113 to provide a first indicia in the dial-type field 310a of the information element field 310. In a step 512, however, the controller 103 will cause the ISDN interface 113 to provide second indicia in the dial-type field 310a. In a step 516, the encoder 204 will encode the audio signal received, such as by $\mu$ law or a-law encoding. Finally, in a step 518 the audio information packet is packed by the ISDN interface 113.

Figure 6:
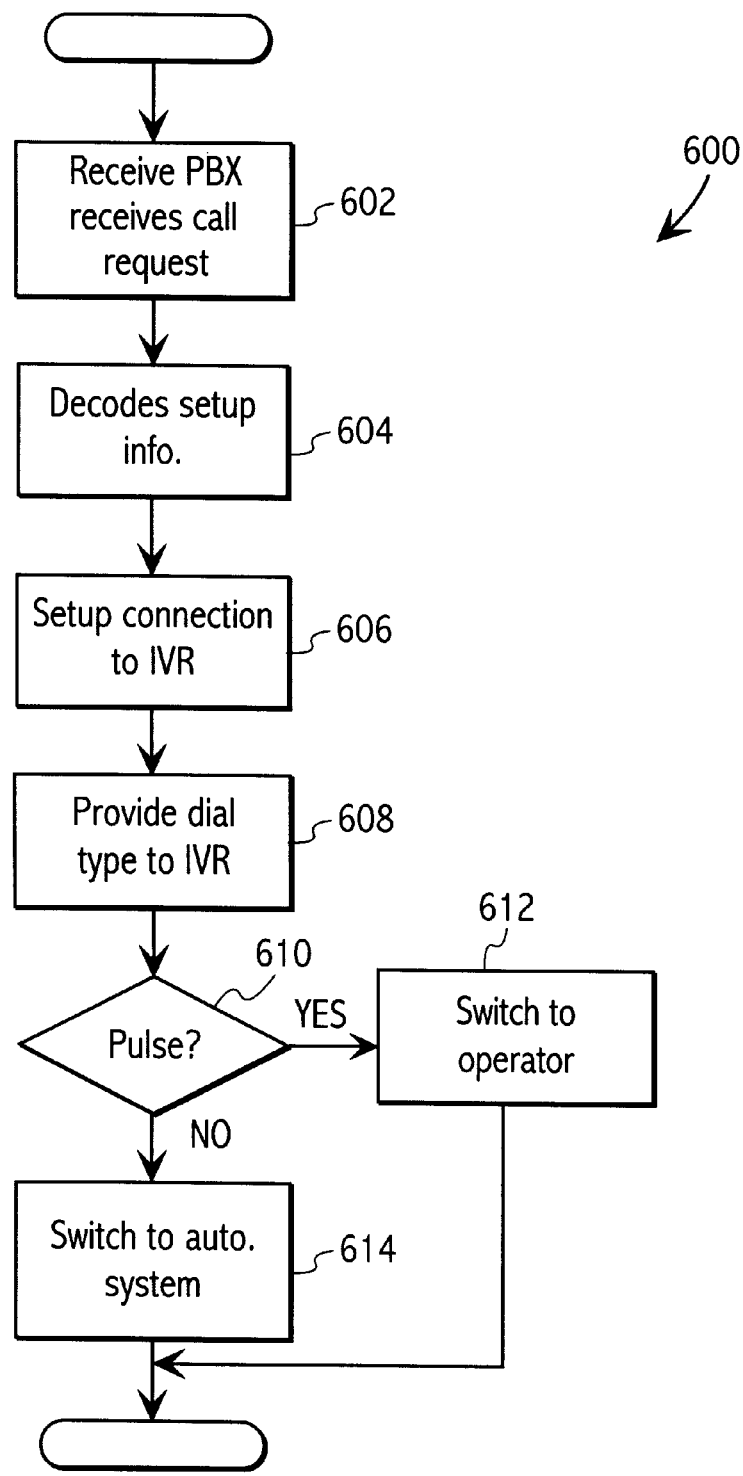
FIG. 6 is a flowchart illustrating operation of another aspect of the invention.

Turning now to FIG. 6, a flowchart illustrating operation of the receiving PBX 106 is shown. In particular, in a step 602 the PBX 106 will receive the call request from the central switch 104. In a step 604, the PBX 106 control unit 109 will decode the received setup information. As is well known, the setup information includes the calling party and called party information. According to the present invention, the setup information further includes a dial-type code as discussed above. In a step 606, the PBX will setup the connection to the IVR 108 or other telephony device. In a step 608, the control unit 109 will, having decoded the setup packet 300, provide the dial-type information to the IVR 108. In a step 610, the IVR 108 determines whether pulse or DTMF dialing has been employed. If pulse dialing has been employed, then in a step 612 the IVR will switch the received call to a human operator. In step 614, if DTMF dialing has been employed, the IVR will activate its automatic interactive voice response mechanism.

The invention described in the above detailed description is not intended to be limited to the specific form set forth herein, but, on the contrary, is intended to cover such alternatives, modifications and equivalents as can reasonably be included within the spirit and scope of the appended claims.

What is claimed is:

1. A telecommunications system configured to respond to pulse and dual tone multi-frequency (DTMF) dialing comprising:
    means at a telecommunications switch for setting up a call between a first telecommunications device and a second telecommunications device;
    means associated with said telecommunications switch for monitoring whether the call from the first telecommunications device is from a DTMF or pulse type device; and
    means for automatically providing a signal to said second telecommunications device indicative of whether said first telecommunications device uses DTMF dialing.

2. A telecommunications system according to claim 1, said second telecommunications device including an interactive voice response (IVR) system.

3. A telecommunications system according to claim 2, said IVR system configured to provide a first response if said first telecommunications device is employing DTMF dialing and a second response if said first telecommunications device is employing pulse dialing.

4. A telecommunication system as recited in claim 3, wherein said first response includes providing automatic IVR responses.

5. A telecommunications system as recited in claim 3, wherein said second response includes switching said call to a human operator.

6. A telecommunications system as recited in claim 1, said providing means including means for encoding a message from said first telecommunications device to said second telecommunications device.

7. A telecommunications system as recited in claim 6, said second telecommunications device including means for decoding said message.

8. A method for calling in a telecommunications system, comprising:
    setting up a call via a switch between a first telecommunications device and a second telecommunications device;
    monitoring at said switch whether the call from the first telecommunications device is from a DTMF or pulse type device; and
    automatically providing a signal to said second telecommunications device indicative of whether said first telecommunications device uses DTMF or pulse dialing.

9. A telecommunications system configured to respond to a first and a second type of dialing comprising:
    means for setting up a call between a first telecommunications device and a second telecommunications device via a switch;
    means associated with said switch for monitoring whether the call from the first telecommunications device is from a device employing said first type of dialing or said second type of dialing; and
    means for automatically providing a signal to said second telecommunications device indicative of whether said first telecommunications device uses said first or second type of dialing.

10. A telecommunications system according to claim 9, said second telecommunications device including an interactive voice response (IVR) system.

11. A telecommunications system according to claim 10, said IVR system configured to provide a first response if said first telecommunications device is employing said first type of dialing and a second response if said first telecommunications device is employing said second type of dialing.

12. A telecommunications system as recited in claim 11, wherein said first response includes providing automatic IVR responses.

13. A telecommunications system as recited in claim 12, wherein said second response includes switching said call to a human operator.

14. A telecommunications system as recited in claim 9, said providing means including means for encoding a message from said first telecommunications device to said second telecommunications device.

15. A telecommunications system as recited in claim 14, said second telecommunications device including means for decoding said message.

16. A telecommunications system configured to respond to a first and a second type of dialing comprising:
    a dialing interface at a switch adapted to receive said first or second type of dialing from a first telecommunications device; and
    a controller operably coupled to said dialing interface and adapted to automatically provide a signal to a second telecommunications device indicative of whether said first telecommunications device uses said first or second type of dialing.

17. A telecommunications switch configured to respond to a first and a second type of dialing comprising:
    a dialing interface adapted to receive said first or second type of dialing from a first telecommunications device; and
    a controller operably coupled to said dialing interface and adapted to automatically provide a signal to a second telecommunications device indicative of whether said first telecommunications device uses said first or second type of dialing.

* * * * *